US007802202B2

(12) United States Patent
Fox et al.

(10) Patent No.: US 7,802,202 B2
(45) Date of Patent: Sep. 21, 2010

(54) COMPUTER INTERACTION BASED UPON A CURRENTLY ACTIVE INPUT DEVICE

(75) Inventors: Eric B. Fox, Seattle, WA (US); Emily K. Rimas-Ribikauskas, Seattle, WA (US); Robert J. Jarrett, Snohomish, WA (US); Leroy B. Keely, Portola Valley, CA (US)

(73) Assignee: Microsoft Corporation, Redmond, WA (US)

( * ) Notice: Subject to any disclaimer, the term of this patent is extended or adjusted under 35 U.S.C. 154(b) by 943 days.

(21) Appl. No.: 11/083,896

(22) Filed: Mar. 17, 2005

(65) Prior Publication Data

US 2006/0209016 A1 Sep. 21, 2006

(51) Int. Cl.
*G06F 3/00* (2006.01)
*G06F 3/048* (2006.01)

(52) U.S. Cl. .................. 715/831; 715/856; 715/861
(58) Field of Classification Search ............... None
See application file for complete search history.

(56) References Cited

U.S. PATENT DOCUMENTS

| 5,694,150 | A | * | 12/1997 | Sigona et al. | 715/856 |
| 5,734,377 | A | * | 3/1998 | Fukuzaki | 345/173 |
| 5,801,704 | A | * | 9/1998 | Oohara et al. | 715/856 |
| 5,999,169 | A | * | 12/1999 | Lee | 345/163 |
| 6,072,463 | A | * | 6/2000 | Glaser | 715/753 |
| 6,232,957 | B1 | * | 5/2001 | Hinckley | 345/156 |
| 6,337,698 | B1 | | 1/2002 | Keely, Jr. et al. | |
| 6,559,830 | B1 | * | 5/2003 | Hinckley et al. | 345/157 |
| 6,600,480 | B2 | * | 7/2003 | Natoli | 345/168 |
| 6,871,327 | B2 | * | 3/2005 | Polk | 715/856 |
| 7,082,578 | B1 | * | 7/2006 | Fishkin et al. | 715/863 |
| 2004/0046736 | A1 | * | 3/2004 | Pryor et al. | 345/156 |
| 2005/0052406 | A1 | * | 3/2005 | Stephanick et al. | 345/156 |
| 2006/0132447 | A1 | * | 6/2006 | Conrad | 345/168 |

* cited by examiner

*Primary Examiner*—Dennis-Doon Chow
*Assistant Examiner*—Anil N Kumar
(74) *Attorney, Agent, or Firm*—Workman Nydegger

(57) ABSTRACT

Described is a computer-implemented system and method that dynamically detects which input device (e.g., pen or mouse) is currently in use, and based on the device, varies a program's user interaction model to better optimize the user's ability to interact with the program via that input device. A tablet input subsystem receives pen and touch data, and also obtains keyboard and mouse data. The subsystem analyzes the data and determines which input device is currently active. The active device is mapped to an interaction model, whereby different user interface appearances, behaviors and the like may be presented to the user to facilitate improved interaction. For example, a program may change the size of user interface elements to enable the user to more accurately scroll and make selections. Timing, tolerances and thresholds may change. Pen hovering can become active, and interaction events received at the same location can be handled differently.

20 Claims, 8 Drawing Sheets

COMPUTER INTERACTION BASED UPON A CURRENTLY ACTIVE INPUT DEVICE

FIELD OF THE INVENTION

The present invention relates generally to computing devices, and more particularly to user interaction with computing devices.

BACKGROUND OF THE INVENTION

Contemporary computing devices allow users to input information in a number of ways, including by keyboard, by one or more types of pointing devices, and by dedicated hardware buttons (typically on portable devices). Voice data and eye movement data (e.g., gaze detection) are other types of data users can input into computer systems via microphones and cameras, respectively.

With respect to pointing devices, a computer system may receive user input from a mouse and/or a touchpad, and if configured with a digitizer, by sensing stylus (pen) proximity and touch, e.g., entered via a pen or a finger. Some personal computers, such as tablet-based personal computers, have the digitizer built into the display screen. This is highly beneficial for many users, as such a computing device can be operated with or without a keyboard.

However, each input device has unique physical and ergonomic characteristics that result in various challenges. One important set of challenges arises because of the way various input devices interact with the content displayed on the screen. For example, a lot of user interface mechanisms such as drop down menus, scroll bars and so forth were modeled for interaction via a mouse, which is typically placed on the desk next to a computer monitor. However, a pen is used directly on the display itself. Thus, when using the pen, a user's hand often blocks a portion of the screen, making it difficult to interact with the computer. As one example, many dropdown menus are very difficult for right-handed users to use with a pen because they drop down so as to be obscured by the user's right hand. Scroll bars can be difficult to manipulate for left-handed users. In sum, these problems, as well as many other similar and related problems, are experienced by computer users as a result of the variety of alternative input devices.

SUMMARY OF THE INVENTION

Briefly, the present invention provides a system and method that detects the type of input device, and modifies a data interaction model (e.g., some of the user interface elements and/or behavior) based on the type of input device that is currently active, so as to facilitate an improved user interaction experience. Possible input devices include one or more pointing devices, (pen and touch digitizers and/or a mouse), as well as a keyboard, hardware buttons, a camera and a microphone. The interaction model may also be modified based on attributes of the user, such as whether the user is left-handed or right-handed.

In one implementation, a tablet input subsystem receives pen and touch data, and also obtains keyboard and mouse data, as well as possibly other input data. The tablet input subsystem (or an associated component) analyzes the data to determine which input device is the source, and selects the most recently active input device as a currently active input device. The evaluation is performed dynamically, during runtime, because multiple input devices may be used by the same user on the same machine in a single session. Some minimum usage time may be required before changing from one currently active input device.

Data identifying the currently active input device is provided to a program, which then maps a user interaction model to the currently active input device. In this manner, a program changes its user interface behavior and/or appearance based on the current device, generally in some way that better enables the user to interact with the program, e.g., more accurately scroll, make selections and so forth.

By way of example, when a pen is detected as the active input device for a right-handed user, dropdown menus may be displayed to the left of the pen selection. Scrollbars, buttons, icons and other selections (e.g., on a menu) may grow, e.g., relative to their size when a mouse is the active device, to facilitate more accurate touch or pen input, depending on which is in use. The cursor, button target size, visual feedback, color scheme, timing, tolerances and other threshold may change to facilitate interaction, such as to provide easy targeting and actuating. Changes may occur (e.g., to tolerances) without visible, audible or other tactile feedback.

Other specific examples include hover feedback, that is, when a pen is in use and is hovering over or near a user interface element. The user interface element may grow, change color, become surrounded by a box or other shape and/or otherwise change to facilitate contact. A region may be magnified based on touch and/or hover.

Still further examples include changing the cursor based on the type of input device, e.g., from a mouse pointer to an image of a microphone for speech, to a larger targeting cursor for touch, and so forth. The cursor may fade or change to a default value when the pen is out of range. The current active input device detection may be used to change the timing, tolerances and thresholds for click-events and gestures.

Different actions may change based on the input device, such as a right-click being disabled for a pen device, and/or single taps instead of double taps allowing one-tap program launching from a pen. Gestures may be enabled, disabled and/or have different meanings based on the device, e.g., pen versus touch versus mouse. The icons or other interaction selections being offered may also change based upon the active input device, e.g., a launch button may be enabled for a certain device, and disabled at other times.

Input data received at the same location may be treated differently depending on the input device that is the source of that data, e.g., ink from a pen, scroll from a finger, and content marking (for selection) from a mouse. Some of the options may be user configurable.

When receiving input from two or more input devices at the same time, the conflict is resolved by selecting the most-recently-used input device as the currently active device, possibly delaying any change until after a device has been used for some minimum time. Note however that in some cases, using two input devices at the same time may yield a third user interaction, e.g., if the user holds down a button while using the pen, the receiving program may respond differently to the pen action. A changed state may automatically revert to a default state, such as when the device that causes the change stops being used for some amount of time.

Other advantages will become apparent from the following detailed description when taken in conjunction with the drawings, in which:

DETAILED DESCRIPTION

Exemplary Operating Environment

Figure 1:
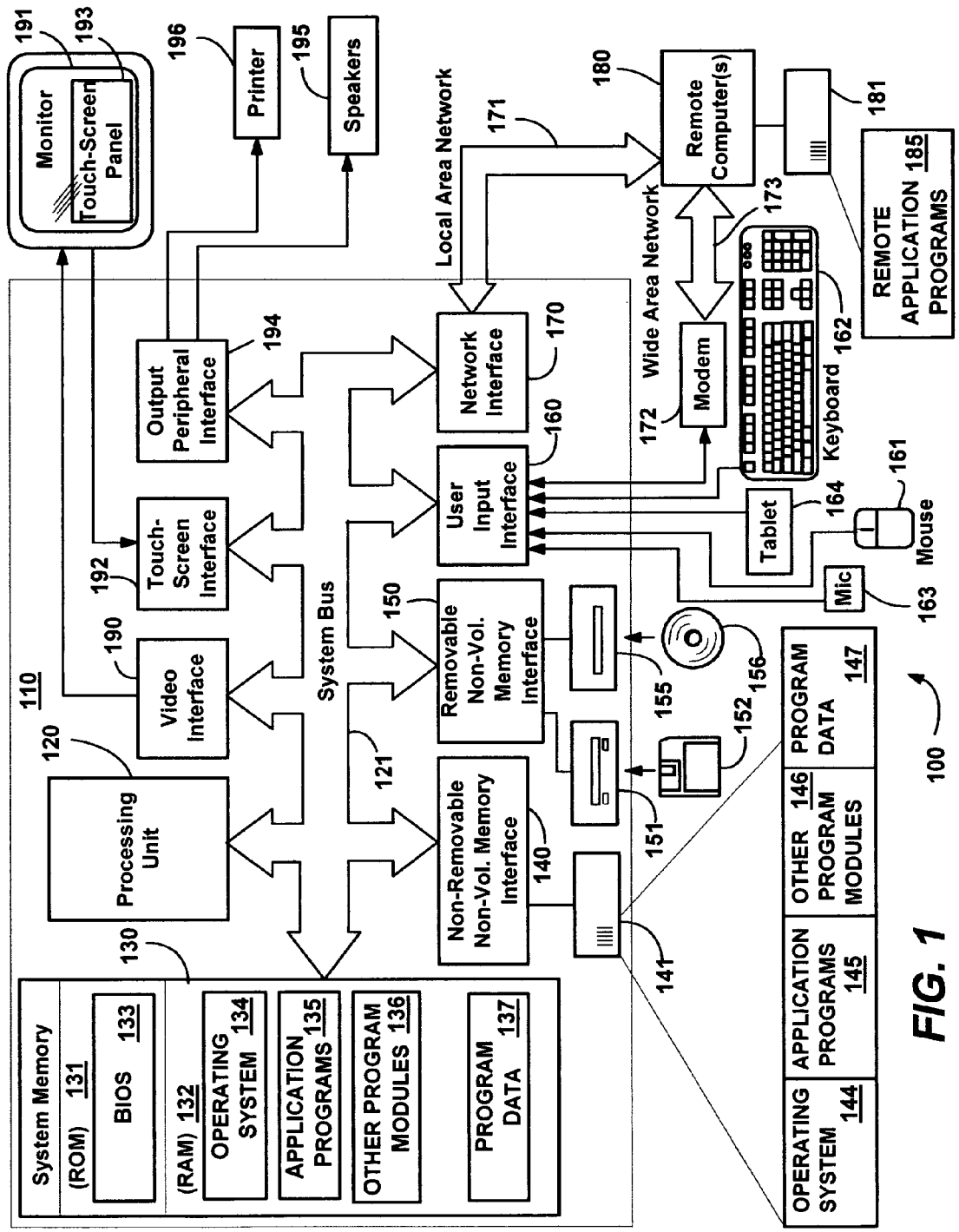
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like, such as PDAs (personal digital assistants), cell phones, smart phones and digital cameras.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input device such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus 9USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that currently active input device, in accordance with various aspects of the present invention.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Input Device Based Feedback for Improved Computer Interaction

The present invention is primarily directed to user input data entered via various input devices, wherein the underlying user interface interaction model is dependent on the type of input device currently in use, so as to facilitate an improved user interaction experience. Although many of the examples herein describe pointing devices, it will be appreciated that aspects of the present invention are applicable to virtually any type of input device's data, such as keyboard-entered data, hardware-button entered data, camera-entered data and microphone-entered (e.g., speech) data. Thus, although for purposes of simplicity the present invention will be primarily described with reference to pointing device input, the present invention should not be limited in any way to any particular types of input devices and/or by the examples used herein.

As will be understood, numerous ways to implement the present invention are feasible, and only some of the alternatives are described herein. For example, many of the changes that may occur to the underlying user interface, such as to change the appearance of what is being displayed in some way, are only some examples of the many possible types of changes that can be readily accomplished. As such, the present invention is not limited to any particular examples used herein, but rather may be used various ways that provide benefits and advantages in computing in general.

Figure 2:
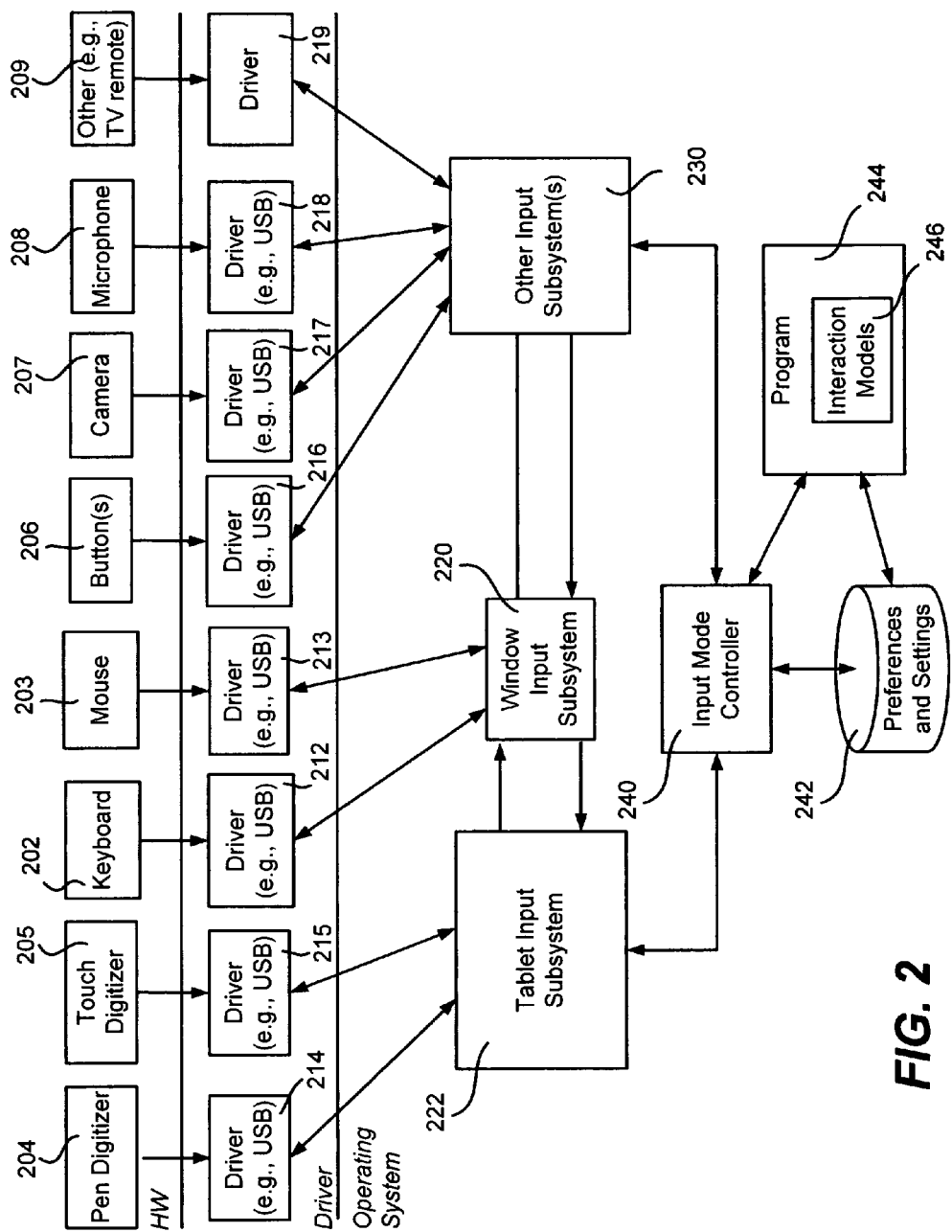
FIG. 2 is a block diagram generally representing components for handling user input, including universal serial bus (USB)-based input from various input devices, in accordance with various aspects of the present invention.

Turning to FIG. 2, there is shown an example architecture in which various hardware input (human interface) devices are shown that provide user input data, such as a keyboard 202, a mouse 203, a pen digitizer 204, a touch digitizer 205, one or more buttons 206, a camera 207 and a microphone 208. Other input mechanisms are feasible, such as a television remote control, as represented in FIG. 2 via the block 209. Each of these hardware devices 202-209 connects through a suitable driver (e.g., 212-219) to an operating system level component. Note that for purposes of example, each input device is shown as having its own driver, however one driver may handle the input of more than one device.

As represented in FIG. 2, the keyboard and mouse generated data are shown as being received at one operating system-level subsystem, referred to as a window input subsystem 220, while pen and touch generated data are shown as being received at another operating system-level subsystem, referred to as a tablet input subsystem 222. The other input data are received at one or more suitable subsystems, represented in FIG. 2 by the block 230. However, other architectures are feasible.

In general, the tablet input subsystem 222 receives the pen and touch generated data, and also obtains any keyboard and mouse data received at the window input subsystem 220. To obtain the keyboard and mouse data, the tablet input subsystem 222 employs low-level hooks to monitor the window input subsystem 220, which in a Windows®—based operating system may be accomplished via well-known application programming interface calls. Other types of input may be similarly monitored.

In general, and as described below, when the user uses one of the input devices, that device becomes an active input device, and an input mode controller 240 may change the underlying user interaction model in some way based on the active input device. The input mode controller 240 may be integrated into the operating system's shell user interface (UI) program, into other operating system components, or into application programs. For example, the shell UI can change the appearance of icons when the mouse is the active input device relative to when the pen is the active input device. The change may be in accordance with preferences and settings 242, including those provided by the user, such as whether the user is left or right handed.

The input mode controller 240 can then communicate input events to a program 244, e.g., the shell, component or application program having focus. The events include pointer and other input data that identifies the input device source. The program 244 then maps the active input device to an interaction model of a set of interaction models.

Figure 3:
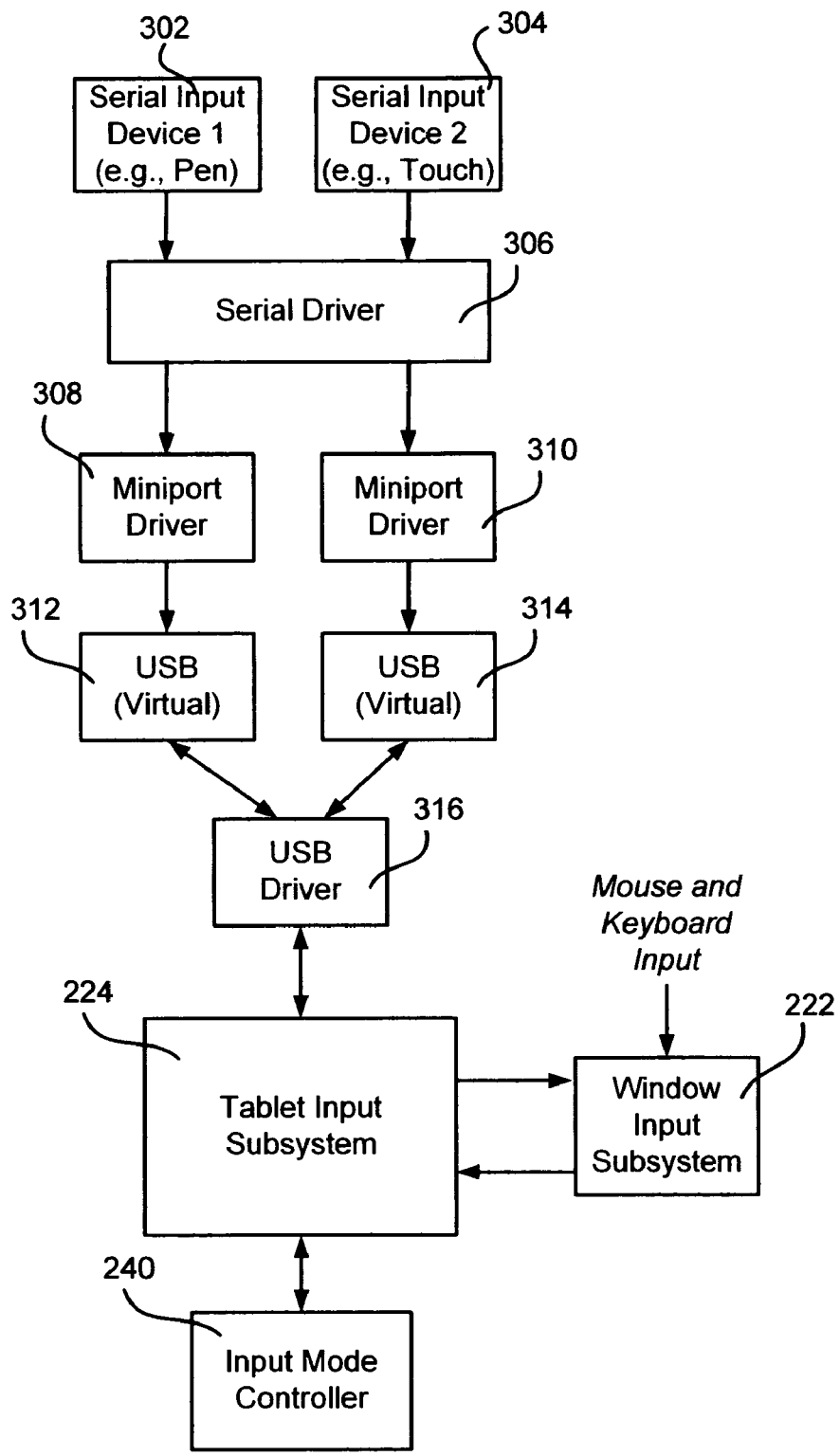
FIG. 3 is a block diagram generally representing components for handling user input, including serial port-based input from various input devices, in accordance with various aspects of the present invention.

FIG. 3 is a representation of a different architecture, in which at least some of the user input data is received via serial ports. For example, many digitizers use the serial port rather than the universal serial bus (USB) because doing so consumes less power. Thus, in the example of FIG. 3, pen and touch data from respective devices 302 and 304 may be received at a serial driver 306. Miniport drivers for each input device, shown as 308 and 310 in FIG. 3, listen for data received at their respective serial ports. The miniport drivers 308 and 310 may expose their corresponding data as coming from a corresponding virtual USB device, whereby one or more suitable USB drivers 316 provide the data to the tablet input subsystem essentially in the same way as represented in FIG. 2.

As an already existing technology, a human interface device (HID) standard differentiates the various devices, and the tablet input subsystem receives HID data packets from each, with information in the packets that identify the type of device that generated the data. This information, along with mouse and/or keyboard data received via the low-level mouse hooks (and possibly other input data), can thus determine when an input device is active, as well as which one is active. Note that the present invention is not limited to HID data packets, and may work with any generalized input API, provided the API allowed the originating device to be identified upon receiving input data. For example, not all keyboards and mice work via the HID interface, whereby the present invention may use an alternate input API (e.g., operating system-provided low-level hooks) to determine when input occurs from such devices.

In accordance with various aspects of the present invention, the tablet input subsystem 224 includes or is coupled to the input mode controller 240 to control the underlying user interface interaction model in some appropriate way, based upon which input device is currently active. The evaluation is performed dynamically, during runtime, because multiple input devices may be used by the same user on the same machine in a single session.

Although there are numerous ways to modify the interaction model, and only some examples are shown herein, in general, the user interface is changed to better optimize the user interaction experience for the active input device. For example, in one implementation, only the user interface for the particular user interface element with which the user is interacting is changed, e.g., when the pen becomes active, the button directly underneath the pen may enlarge, rather than every control on the page, which remain normal size. However, for some user interface elements this may not apply; for example, the cursor is always considered 'in use,' so whenever new input device becomes active, the cursor is changed.

Figure 4A:
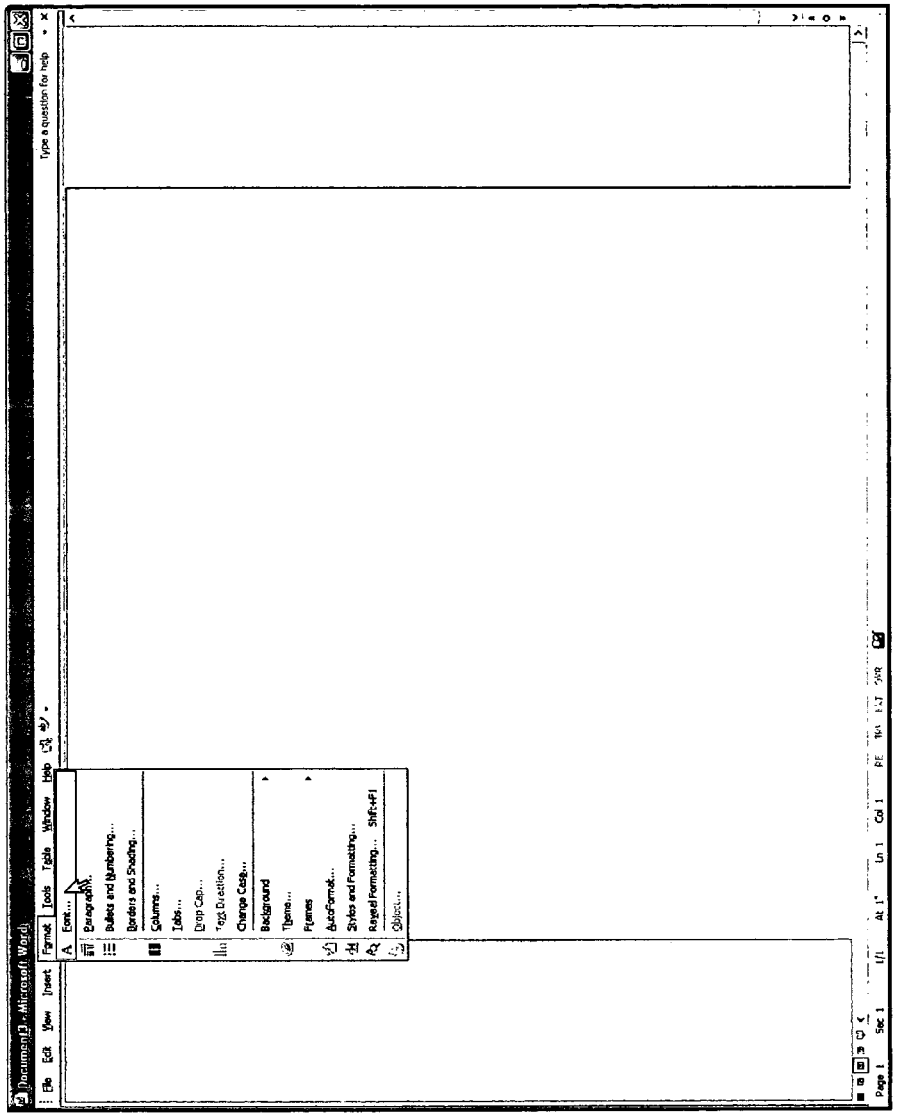
FIGS. 4A through 6 are representations of various examples of changing an interaction model based upon a currently active input device, in accordance with various aspects of the present invention.
Figure 4B:
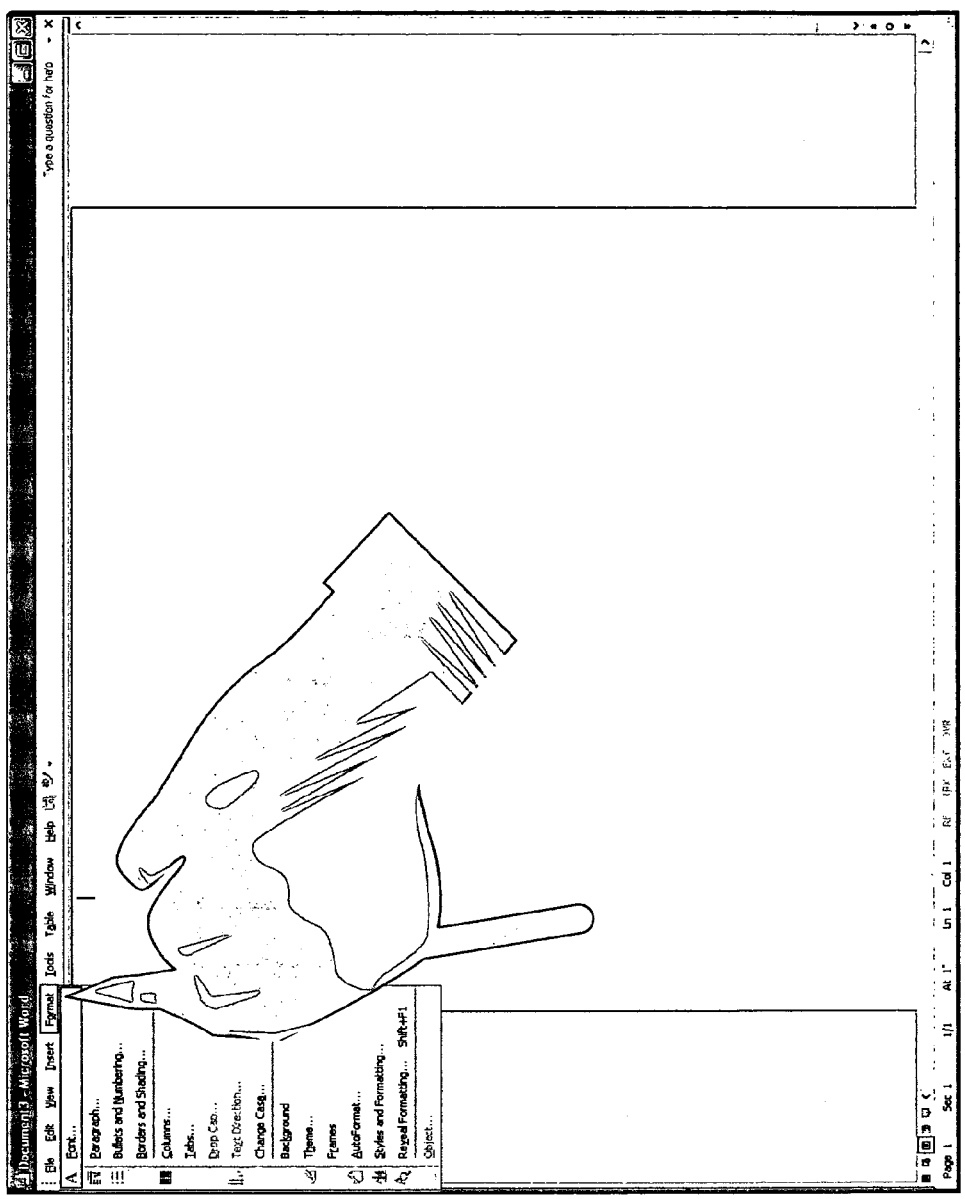

Thus, in one example, when a pen is detected as the active input device for a right-handed user, dropdown menus may be displayed to the left of the pen selection. In contrast, if the mouse is being used, the dropdown menus can be to the right, as it is in most contemporary shell programs and application programs. This is generally represented in FIGS. 4A (mouse) and 4B (pen), where the user interface is dynamically altered, at runtime, to compensate for any hand blockage created when a pen is used. As can be seen in FIG. 4B, when the pen is detected as being used as the active input device, and the settings (or touch sensing) indicate the user is right handed, the input mode controller 240 (e.g., in the shell user interface program) presents dropdown menus to the left, so that they are not displayed under the user's hand.

Note the position has been altered for the pen, thereby improving user interaction with the device, however the basic user interface elements may remain the same. As a result, the user need not learn an entirely new way of interacting with the machine. Although the operating system and the application programs may react differently depending on the input device used, the primary end result may remain consistent to the user so as to avoid requiring the user to learn new interactive models for each input device. For example, users know that a button is always invoked by actuating it in some way, but each device may present the user with an optimized cursor, button target size, visual feedback, color scheme, timing threshold, auditory feedback or additional user interface assistance to facilitate easy targeting and actuating of the button with the currently active device.

Figure 5A:
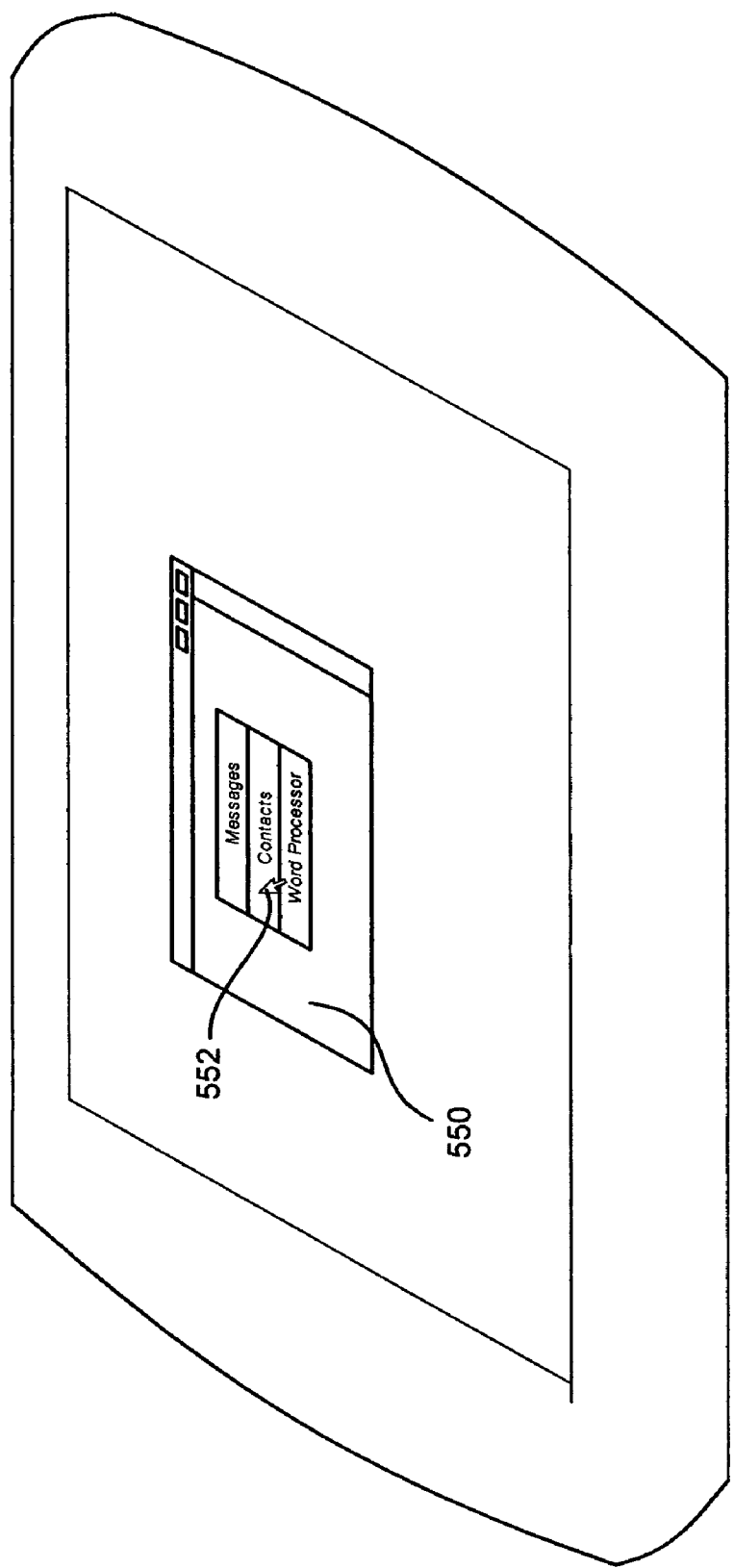
Figure 5B:
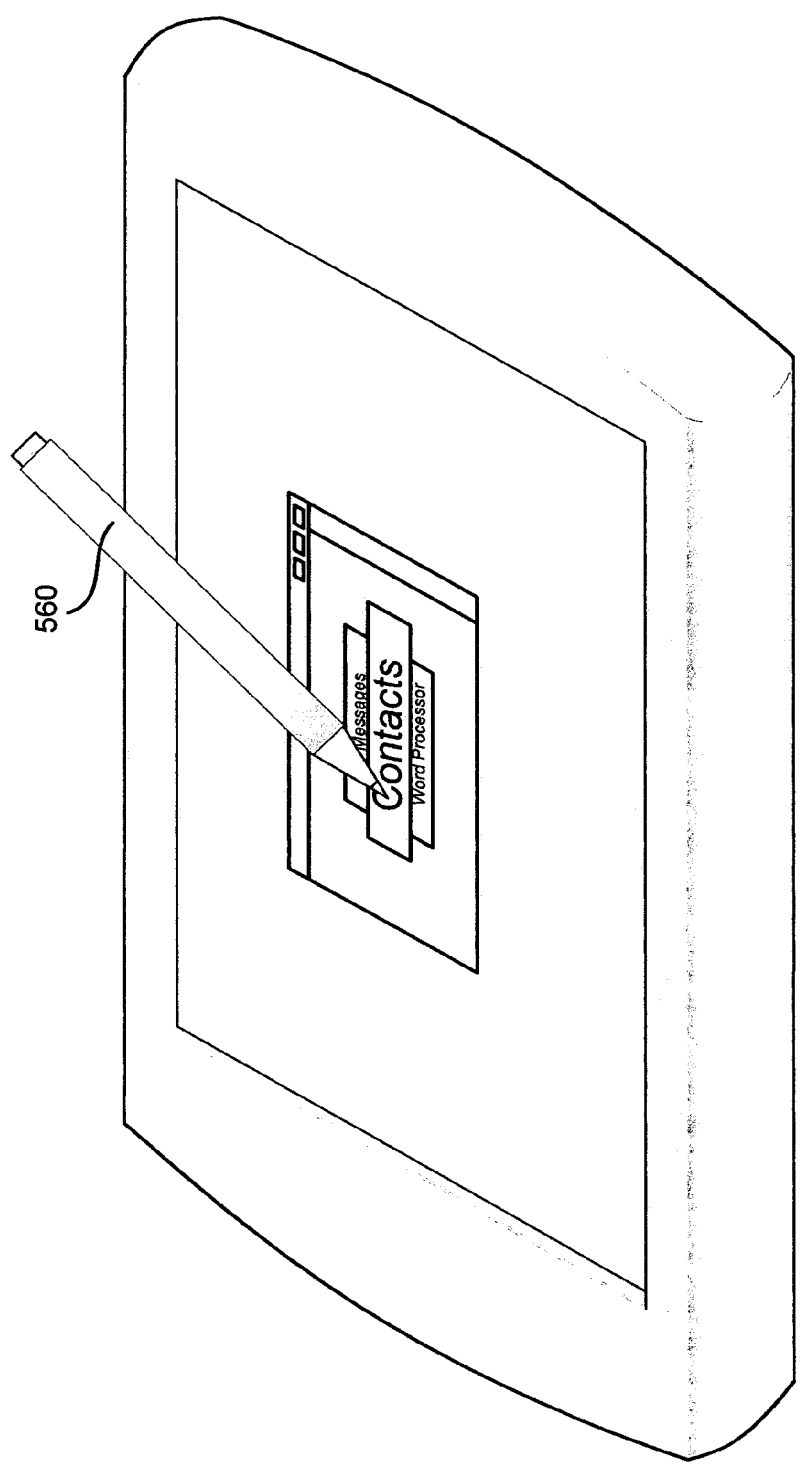

Other specific examples include hover feedback, as generally represented in the different interaction models of FIGS. 5A and 5B. In FIG. 5A, when the mouse is used in a program window 550, as indicated by the mouse pointer 552, regular selection behavior is provided. In FIG. 5B, however, when a pen 560 is hovering over a selection, the selection grows to facilitate contact therewith. Note that this is typically advantageous because a pen is generally less accurate for most users than a mouse. As can be readily appreciated, scrollbars are another type of user interface element that can be enlarged when a pen is detected as the active input device, which may be the state at all times while the pen is active, or only when the pen is hovering on or near a scrollbar. The enlarging of the element may be even larger when touch is the active input device, e.g., to facilitate contact by a finger. Speech input, possibly along with proximity detection, can greatly enlarge displayed output, so that, for example, a user can communicate by speech with a computer from a relatively larger distance than typical, and still see visible results.

Figure 6:
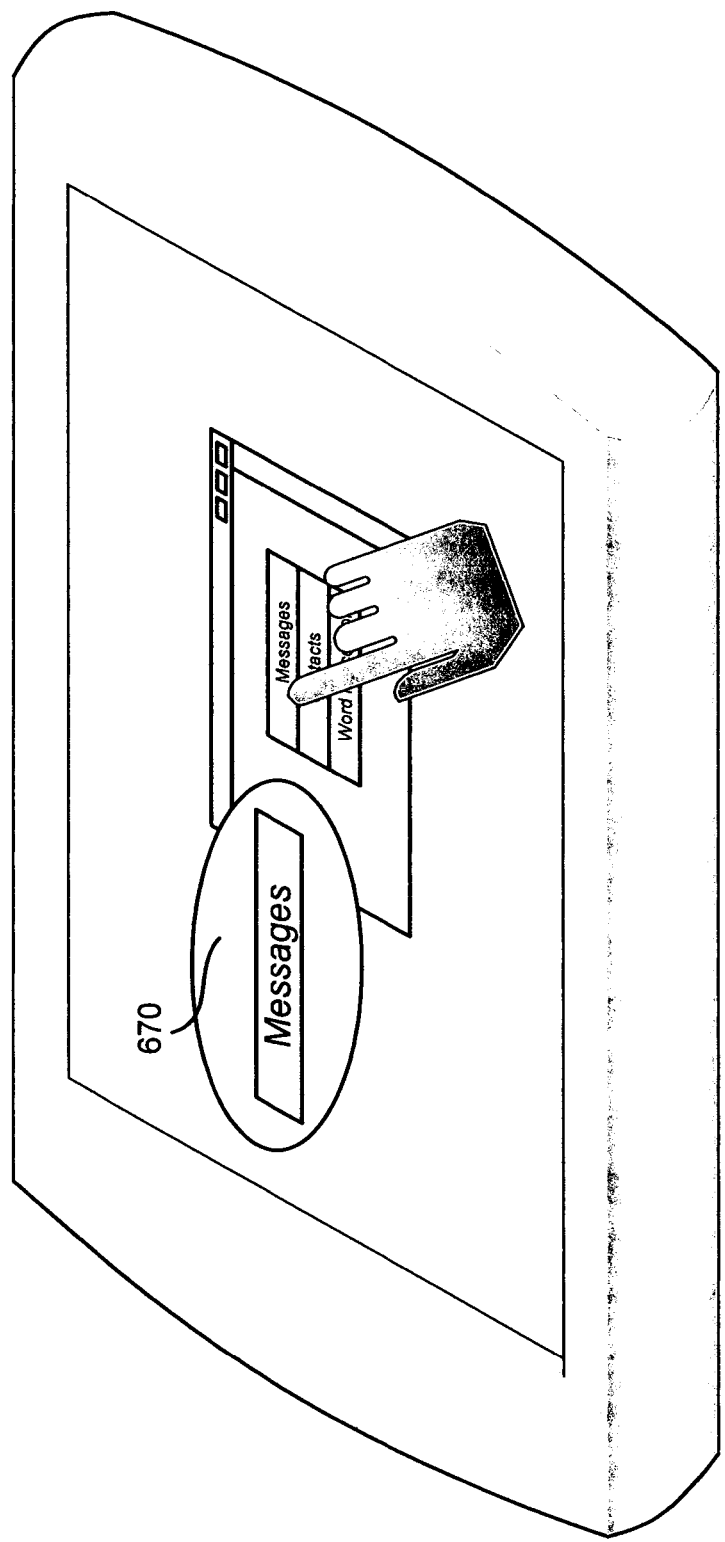

Another example of altered feedback is represented in FIG. 6. In FIG. 6, a user can touch an item once, resulting in a magnified region 670 corresponding to the area. The user thus knows at what location the computer is sensing or has just sensed the finger, and if desired, can then touch the item in the same general location to select it, or touch the magnified area 670 to select it, e.g., within a reasonable amount of time such as while it remains visible. If not the desired area, the user can touch a different location whereby a different selection can be highlighted, or not touch anywhere for a timeout period, whereby the magnified region 670 will disappear until the touch digitizer next senses touch. Note that the region 670 can be displayed, to the extent it will fit, generally to the left for right-handed users, and to the right for left-handed users. Further, note that instead of a double-touch selection with touch, such a magnified region can be used with a hovering pen, whereby only a single tap is then needed to select.

Still further examples include changing the cursor based on the type of input device, e.g., from a mouse pointer to an image of a microphone for speech, to a larger targeting cursor for touch, and so forth. The cursor may fade or change to a default value when the pen is out of range. Note that tolerances may be changed even without visible, audible or other tactile feedback. Current active input device detection may be used to change the timing, tolerances and thresholds for click-events and gestures.

When a pen is in use, right click may be disabled, or may be activated by pen-tap-and-hold, a gesture (e.g., a flick to the right) or may be based on the barrel button state. Similarly, a single pen tap on a selection may make a selection, such as to launch an application program, with a double-click required when the mouse is active.

The interaction selections being offered may also change based upon the active input device, e.g., a launch button may be shown for a special pen input surface whenever the pen is active, and disabled (hidden or grayed out) at other times. Programs may also change modes and behaviors, e.g., defaulting to ink mode when a pen is active, and changing what pointer events mean, e.g., in the same program in the same general data-receiving state, pen input inks, touch input scrolls, and mouse input marks a selection for cutting or copying. In a selection-marking state, the mouse may mark content for cutting or copying via a rectangle, while the pen may mark content free form, or via a lasso selection.

As can be readily appreciated, at least some of the options including those exemplified above may be user configurable. Thus, one user might want a single pen tap on an icon to launch the corresponding program, while another user may prefer a double pen tap, or a gesture.

It is possible to receive input from two or more input devices at the same time. In general, the conflict as to which input device is the active one is resolved by selecting the most-recently-used input device. However, a time window may be employed before switching from one to another, to ensure that the user has actually switched. In this way, inadvertently bumping the mouse when entering pen input, for example, does not cause a change.

A changed state may automatically revert to a default state. For example, when the pen is out of range of the digitizer, the computing device can enter a user interface model better optimized for mouse or touch input. If the pen comes back into range, the state may be changed again to better optimize for pen input.

As can be seen from the foregoing detailed description, there is provided a method and system that dynamically adapts a user interaction model during runtime for an active input device. Various appearances, timing, tolerances, selections and so forth may change to better optimize for the particular input device that is currently active. In this manner, specific user interface changes map to the input device currently being used.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing device, a computer-implemented method for facilitating an improved user interaction experience by dynamically modifying one or more user interface elements of at least one computer program, the method comprising:

detecting, dynamically during runtime, which input device of the plurality of input devices of the computing device is a currently active input device;

determining that the detected currently active input device is associated with one or more user characteristics associated with the user that indicate one or more user interface element behavior modifications that are to be applied during use of any detected currently active input device associated with the user, the behavior modifications comprising functional changes to the manner in which each interface element reacts to inputs from the currently active device, wherein an input gesture received from a first input device has a different meaning than the same input gesture received from a second, different input device, such that the same input gesture results in different actions being performed depending on which input device is determined to be currently active;

mapping the currently active input device to a user interaction model for that device which is selected from a plurality of user interaction models each corresponding to a variety of different input devices, the selected user interaction model corresponding with the currently active input device, the user interaction model including one or more user interface elements that are disabled based on which device is selected;

modifying the user interface behavior of the at least one computer program to which the currently active input device is providing input by modifying at least one user interface element of the at least one computer program, wherein said modification is based on the selected user interaction model which corresponds to the detected currently active device, and wherein the modification includes changing the appearance of at least one interface element and changing the interface behavior of at least one interface element according to the appropriate corresponding user interaction model, the interface behavior change including altering at least a gesture input timing threshold for the interaction model based on which input device is determined to be currently active, such that gesture input timing is altered to improve gesture recognition for the currently active input device.

2. The method of claim 1 wherein detecting which input device is the currently active input device comprises identifying the input device based on received input data.

3. The method of claim 1 wherein modifying the user interface behavior of the at least one computer program comprises providing visible, audible and/or tactile feedback to a user.

4. The method of claim 1 wherein modifying the user interface behavior of the at least one computer program comprises changing a size of a user interface element to cover a different interactive area, wherein the element comprises at least one element of a set, the set containing, a scrollbar user interface element, a menu selection user interface element, a button user interface element, an icon user interface element, text, a link, a radio button user interface element, and a check box user interface element.

5. The method of claim 1 wherein modifying the user interface behavior of the at least one computer program comprises changing at least two data values of a set of data, the set including appearance, timing, tolerance and threshold data.

6. The method of claim 1 wherein modifying the user interface behavior of the at least one computer program comprises handling input received at a same location differently based upon the currently active device.

7. The method of claim 1 wherein detecting which input device of the plurality of input devices is the currently active input device comprises, selecting an input device from the plurality, the plurality including at least two of, a touch digitizer, a pen digitizer, a mouse, a keyboard, a microphone, a camera and a television-style remote control device.

8. A computer-readable storage medium having computer-executable instructions stored thereon which, when executed, perform steps comprising the steps of the method of claim 1.

9. The computer-readable storage medium of claim 8 wherein modifying the at least one user interface element comprises providing visible, audible and/or tactile feedback to a user.

10. The computer-readable storage medium of claim 8 wherein modifying the at least one user interface element comprises changing a size of a user interface element to cover a different interactive area.

11. The method of claim 1, further comprising:

recognizing a different input device as an active input device after the different input device has been activated for a predetermined minimum time; and ignoring the different input device if the different input device has not been activated for the predetermined minimum time.

12. The method of claim 1, further comprising determining that the detected currently active input device is one of a touch digitizer or pen digitizer;

and further, wherein modifying at least one user interface element of the selected user interaction model comprises:

determining that one of a pen device or a user's finger is hovering over the at least one user interface element; and magnifying the user interface element over which the pen device or user's finger is hovering, such that the magnified user interface element is selectable by the pen device or user's finger.

13. The method of claim 1, wherein modifying at least one user interface element of the selected user interaction model comprises:

determining that a user's speech input is to be used to interact with the user interaction model; and magnifying the at least one user interface element such that the element is distinguishable from a greater distance away from the element's display.

14. The method of claim 1, further comprising modifying a displayed mouse icon, such that the displayed mouse icon corresponds to the detected currently active input device.

15. The method of claim 1, further comprising:

determining that one or more interaction selections are to be displayed based on which device was detected as the currently active input device; and based on the determination, displaying the one or more interaction selections.

16. The method of claim 1, further comprising allowing a user to change user interaction model behavior such that, in the same general data-receiving state, each input device, upon inputting an input, performs a different function.

17. The method of claim 16, wherein a gesture that a user makes with an input device has a plurality of meanings to the user interaction model, depending on which device is the currently active input device.

18. A method for modifying one or more user interface elements of a computer program on a computer system based on which input device is currently selected and one or more user preferences associated with the currently selected input device, the method comprising:

detecting, dynamically during runtime, which input device of a plurality of input devices of the computing device is a currently active input device;

determining that the detected currently active input device is associated with one or more user characteristics associated with the user including the user's hand preference, the user characteristics indicating one or more user interface element behavior modifications that are to be applied during use of any detected currently active input device associated with the user, the behavior modifications comprising functional changes to the manner in which each interface element reacts to inputs from the currently active device, wherein an input gesture received from a first input device has a different meaning than the same input gesture received from a second, different input device, such that the same input gesture results in different actions being performed depending on which input device is determined to be currently active and wherein the behavior modifications include changing both the timing and tolerances for click-events and gestures;

determining, based on user characteristics indicating the user's hand preference, that one or more user interface elements are to be shifted horizontally during use of the detected currently active input device, such that the user's hand is prevented from blocking the user interface elements;

mapping received input from the currently active input device to a user interaction model for that device which is selected from among a plurality of user interaction models each corresponding to a variety of different input devices, the selected user interaction model corresponding with the currently active input device, the user interaction model including one or more user interface elements that are disabled based on which device is selected; and modifying at least one user interface element of the selected user interaction model based on the detected currently active device, the modifying including horizontally shifting the one or more user interface elements such that blocking of the user interface elements by the user's hand is prevented, the modifying further including altering both a gesture input timing threshold and a gesture input tolerance setting for the interaction model based on which input device is determined to be currently active, such that both the gesture input timing and the gesture input tolerance settings are altered to improve gesture recognition for the currently active input device.

19. The method of claim 18, wherein the one or more user interface elements are shifted horizontally left when the user's hand preference is determined to be right-handedness.

20. The method of claim 1, further comprising determining that the detected currently active input device is one of a touch digitizer or a pen digitizer; and further, wherein modifying the user interface behavior of the at least one program comprises:

determining that one of a user's finger or a pen device was used to interact with the touch digitizer or the pen digitizer, the user interaction constituting a touch in the region representing a particular user interface element;

magnifying the touched user interface element;

leaving the user interface element magnified for a time period constituting a reasonable amount of time;

detecting a second user touch with the user's finger or the pen device in the general location of the user interface element or in the magnified area during the time period, the user thereby indicating a user selection of the user interface element; and causing the magnified region to disappear if the user touches a location outside the region representing the user interface element or if the time period expires before the user interacts with the touch digitizer or pen digitizer for a second time.

* * * * *